United States Patent [19]

Cochrane

[11] 4,211,656
[45] Jul. 8, 1980

[54] LIQUID TREATING SYSTEM

[76] Inventor: John J. Cochrane, 418 Lewis Wharf, Boston, Mass. 02110

[21] Appl. No.: 919,178

[22] Filed: Jun. 26, 1978

[51] Int. Cl.² .............................................. B01D 23/24
[52] U.S. Cl. ....................................... 210/149; 210/274; 210/279; 210/291
[58] Field of Search ............... 210/108, 149, 274, 275, 210/277, 278, 279, 292, 291, 264

[56] References Cited

U.S. PATENT DOCUMENTS

| | | | |
|---|---|---|---|
| 800,808 | 9/1905 | Hill | 210/279 X |
| 1,031,886 | 7/1912 | Surkerborm | 210/264 |
| 1,685,204 | 9/1928 | Schreier | 210/291 X |
| 2,401,122 | 5/1946 | Thoresen et al. | 210/275 X |
| 2,904,518 | 9/1959 | Shea | 210/149 X |
| 3,134,735 | 5/1964 | Greenleaf, Jr. | 210/275 X |
| 3,189,181 | 6/1965 | Couse | 210/291 |
| 3,312,348 | 4/1967 | Greenleaf, Jr. | 210/264 |
| 3,366,241 | 1/1968 | McMorris | 210/277 X |
| 3,846,304 | 11/1974 | Garbo | 210/80 |
| 3,984,326 | 10/1976 | Bendel | 210/264 |
| 4,126,546 | 11/1978 | Hjelmner et al. | 210/80 X |

FOREIGN PATENT DOCUMENTS

| | | | |
|---|---|---|---|
| 778166 | 3/1935 | France | 210/292 |
| 364332 | 11/1973 | U.S.S.R. | 210/279 |

*Primary Examiner*—John Adee

[57] ABSTRACT

A liquid treating system having a tank with a multiplicity of cells, the bottom of each cell converging downwardly toward a drain, and means for backwashing one or more of the cells while the remaining cells continue treating the liquid. Also described are a barrier for separating the cells and a kit for making the barrier.

32 Claims, 4 Drawing Figures

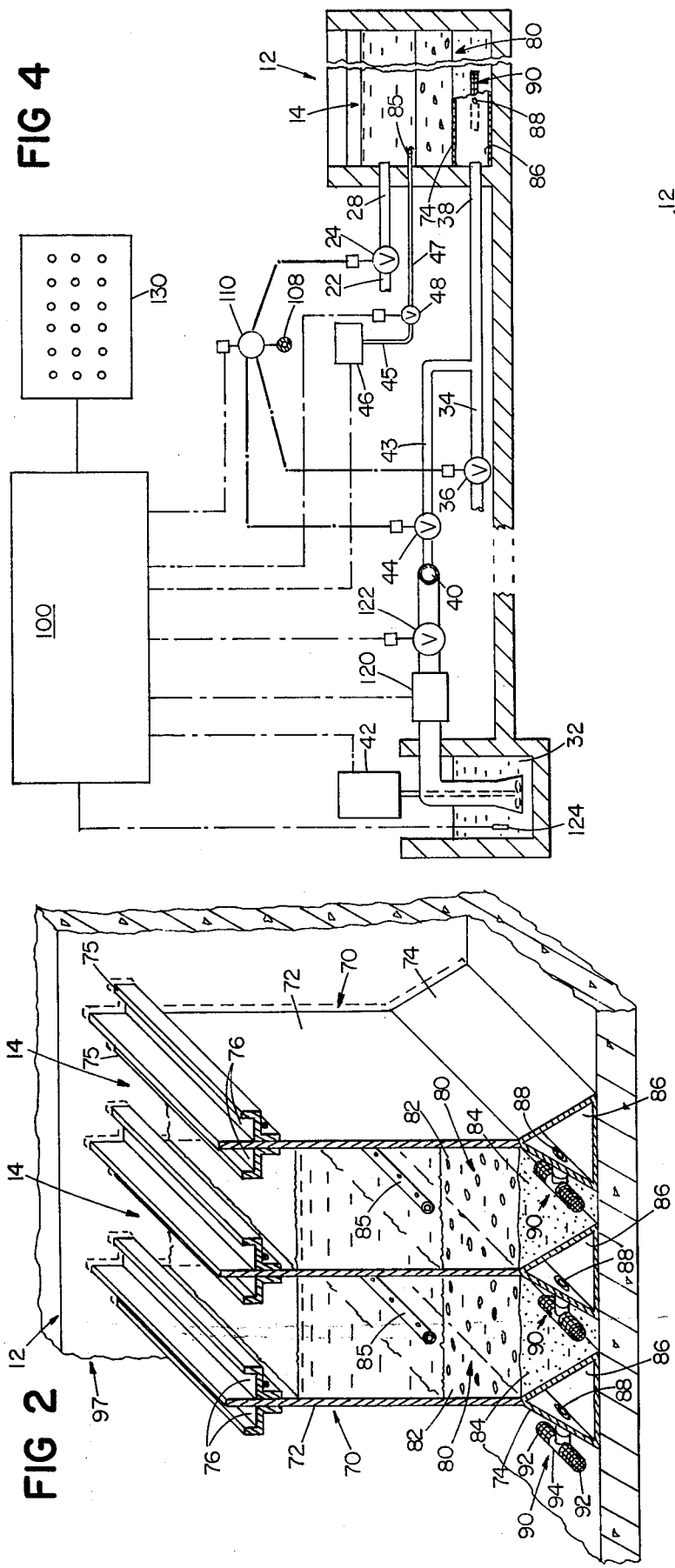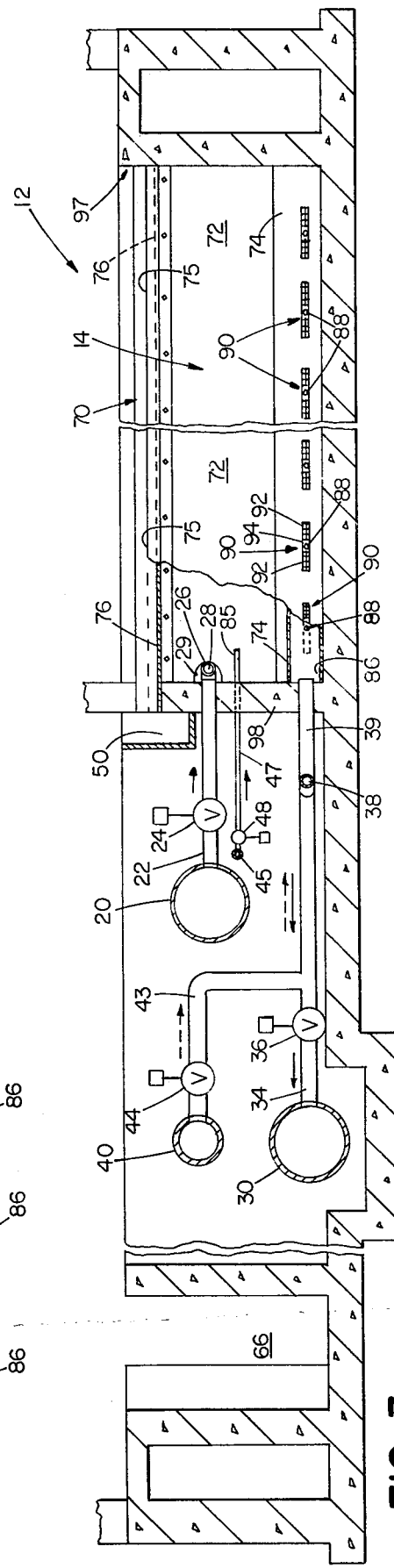

LIQUID TREATING SYSTEM

FIELD OF THE INVENTION

This invention relates to filter and reactor systems for treating liquids, especially water.

BACKGROUND OF THE INVENTION

Conventional filter systems have single large area beds which are cleansed all at once. This requires storage of a quantity of clean water sufficient to backwash the entire bed. Also, there is a substantial amount of costly downtime because the filter system is of necessity out of operation during the backwashing cycle.

Another problem with such filters is that the backwashing liquid often does not permeate the entire filter bed, leaving "dead spots" where the filter media is not cleansed.

Greenleaf U.S. Pat. No. 3,312,348 shows a circular filter divided into segments to form isolated cells connected in parallel around a common central reservoir. A cell or cells can be backwashed from the reservoir while the remaining cells continue to filter influent. While Greenleaf does not require a complete system shutdown during backwashing, its complex circular arrangement cannot be readily adapted to meet the capacity requirements of a specific application without the addition or deletion of discrete circular filter systems.

Garbo U.S. Pat. No. 3,846,304 and Schreier U.S. Pat. No. 1,685,204 each show filter systems in which backwashing water and air are distributed upwardly through single large area filter beds having conically shaped bottoms. These systems do not continue to operate as filters during backwashing.

It would be desirable to have a filter system which avoids the problems of downtime and "dead spots", is compact, and does not require complex plumbing.

SUMMARY OF THE INVENTION

I have discovered a filter system which operates continuously—even while it is being backwashed. The backwash water permeates the entire filter bed, avoiding the problem of "dead spots". A minimal amount of backwash water storage is required. My system has a simple plumbing arrangement and is compact. Also, my system may be prefabricated; yet its capacity is easily altered to meet the requirements of a specific application.

In one aspect the invention features a tank, an influent conduit communicating with the tank adjacent the top thereof, a reservoir downstream of the tank, an effluent conduit communicating between the tank and the reservoir, a backwash conduit communicating between the reservoir and the tank, and means adjacent the top of the tank for carrying backwashing liquid therefrom, the tank having a multiplicity of transversely extending contiguous cells each having a drain adjacent its bottom communicating with the backwash and effluent conduits, the bottom of each cell converging downwardly toward its drain. In preferred embodiments the tank is rectangular, and each cell has a width substantially less than its length and extends across one linear dimension of the tank; the bottom of the tank is formed by a generally horizontal planar surface intersected by two downwardly converging planar surfaces; each cell has a multiplicity of drains comprising cylindrical screen elements mounted on T-shaped centers; horizontally spaced fiberglass barriers, each having a triangular base and a vertical wall portion, separate the cells; the drains are removably connected to a conduit extending longitudinally of each barrier within the base; and the means for carrying the backwashing liquid is a trough at the top of each cell, a sump downstream of the tank, and a longitudinally extending channel communicating along its length with the trough of each cell and communicating at its one end with the sump.

In another aspect my invention features a system having a longitudinally extending tank, the tank having a multiplicity of contiguous cells extending lengthwise transversely of the tank, the width of each cell being less than its length, an influent conduit means for supplying liquid to be treated to each of the cells, the influent conduit means communicating with each of the cells adjacent the tops thereof, effluent conduit means for removing treated liquid from each of the cells, and means for backwashing one or more of the cells while the remaining cells continue treating the liquid. In preferred embodiments the means for backwashing includes a system of hydraulic valves operated by solenoid valves, which in turn are controlled by a microprocessor; and the microprocessor maintains a uniform expansion of the system's filter bed during backwashing of each cell by controlling flow in a pipe leading from a backwash pump in response to temperature changes in the backwashing liquid, sensed by a thermal probe.

In yet another aspect my invention features a barrier for separating a liquid treating tank into discrete cells, the barrier having a vertical wall portion, and a base connected to the wall portion adjacent its bottom, the base extending longitudinally parallel to the plane of the wall portion and having a pair of sides diverging downwardly from this plane on opposite sides of the wall portion. In preferred embodiments the barrier is provided with a multiplicity of longitudinally spaced removable drains, which communicate with an end of the base through a conduit portion within the base.

In yet another aspect my invention features a kit for constructing a barrier for separating a liquid treating tank into discrete cells.

My system is inexpensive, is simple to construct, has few moving parts, requires no surface skimming, is completely automated, and has low overall operational and maintenance costs.

PREFERRED EMBODIMENT

I turn now to the structure and operation of the preferred embodiment, first briefly describing the drawings thereof.

DRAWINGS

FIG. 2 is a section, taken along 2—2 of FIG. 1.

FIG. 3 is a section, somewhat schematic and partially broken away, taken along 3—3 of FIG. 1.

FIG. 4 is a schematic diagram of the control system of the filter system of FIG. 1, including a section, partially broken away, taken along 4—4 of FIG. 1.

STRUCTURE

Figure 1:
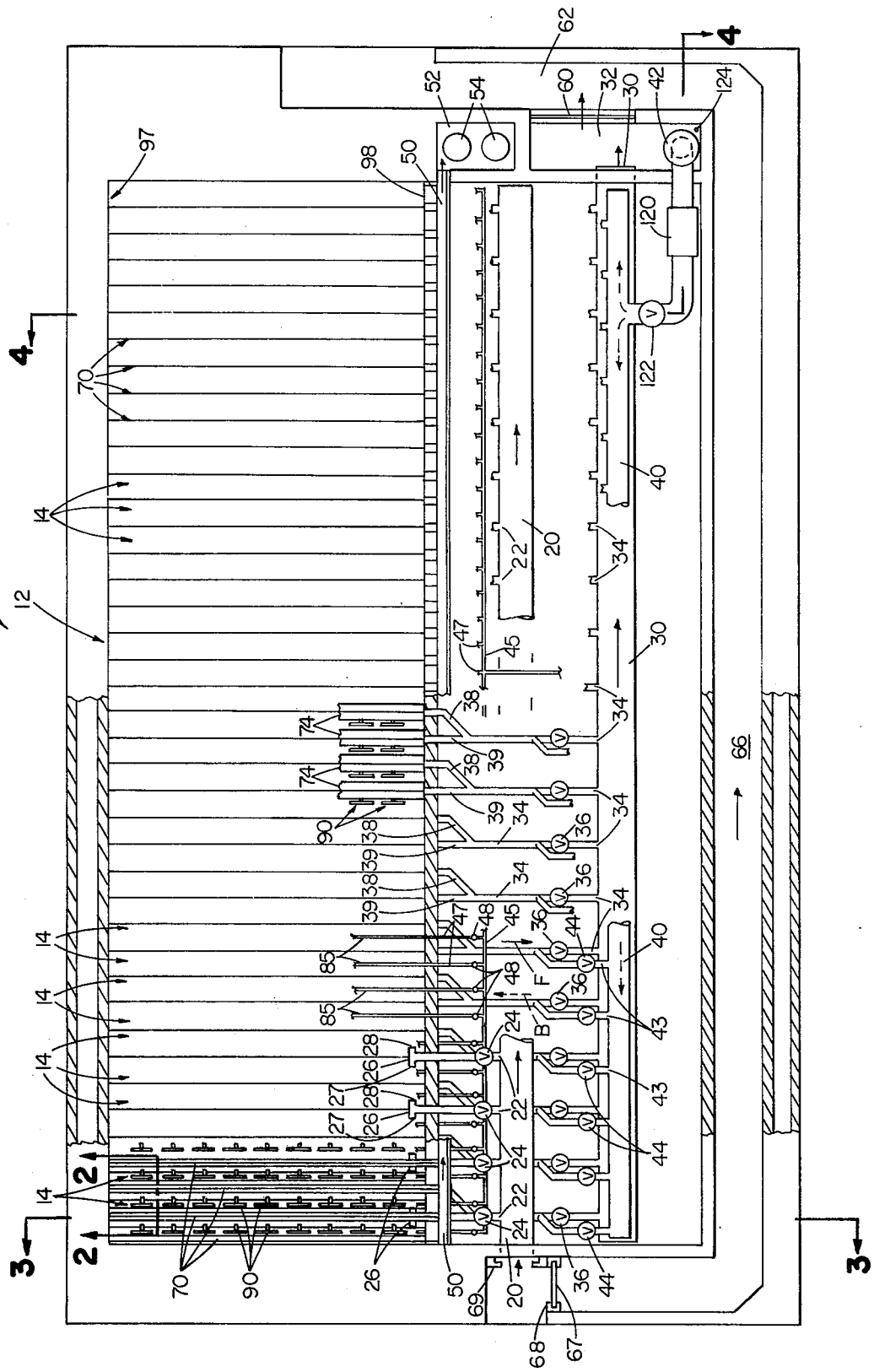
FIG. 1 is a schematic plan view of a filter system embodying the invention.

There is shown schematically in FIG. 1 a filter system 10 having a tank 12 formed by twenty-six transversely extending contiguous rectangular cells 14.

Influent conduit 20 communicates with tank 12 through pipes 22. Each pipe 22 has an influent valve 24 and serves two adjacent cells 14 through tees 26 having outlets 27 and 28.

Effluent conduit 30 communicates between tank 12 and reservoir 32 through pipes 34. Each pipe 34 has an effluent valve 36 and serves two adjacent cells through branches 38 and 39.

Backwash conduit 40 communicates between backwash pump 42 in reservoir 32 and tank 12 through branches 43 in pipes 34. Each branch 43 has a backwash valve 44.

Air conduit 45 communicates between air compressor 46 (not shown in FIG. 1) and cells 14 through pipes 47, each of which has a solenoid valve 48.

Conduits 20 and 30 are thirty-inch diameter ductile iron. Pipes 22 and 34 are six-inch diameter ductile iron. Conduit 40 is twelve-inch diameter ductile iron.

Tank 12 has a longitudinally extending channel 50 which is contiguous along its length with the upper portion of an end of each of cells 14, and which communicates at its one end with a washwater sump 52. Sump 52 has two submersible pumps 54.

Reservoir 32, a backwash water storage area, has an adjustable overflow weir 60, which is positioned to spill into filter effluent channel 62. Channel 62 leads to a filtered water storage area (not shown). Influent bypass channel 66 communicates between the upstream end of conduit 20 and channel 62. A slide gate 67 is selectively positioned in either guide 68 or guide 69 to direct the influent to conduit 20 or to direct the influent through bypass channel 66 respectively. (should there be an excess of influent when gate 67 is positioned in guide 68, it will spill over the gate into bypass channel 66).

Referring to FIG. 2, cells 14 are separated by fiberglass barriers 70. Each barrier 70 has a wall portion 72, which is connected at its lower end to a triangular base 74 (by a vertical flange (not shown) protruding from the apex of base 74 and bolted to wall 72 adjacent its lower edge). Trough 76, connected to wall 72 adjacent its upper end, communicates with channel 50 (as shown in FIG. 1). Each leg of triangular base 74 is 18 inches, and the overall height of each barrier 70 is six feet. The barriers are horizontally spaced in parallel at a distance of two feet between their walls 72.

Filter media 80 is placed in the lower portion of each cell 14. For filtration, media 80 comprises a 15 inch deep layer of anthracite 82 (1 mm particle diameter) on top of a 15 inch deep layer of sand 84 (½ mm particle diameter, specific gravity 2.65). A perforated air line 85, connected to a pipe 47, extends longitudinally of each cell on top of media 80.

A branch 38 or 39 of a pipe 34 is connected to a conduit 86 (triangular in cross section) within base 74 of each barrier 70, and communicates with a cell 14 through PVC pipes 88, which are connected to drains 90.

Each drain 90 has two cylindrical screen elements 92, which extend from the ends of a PVC T-shaped center 94. Screens 92 are approximately four inches long and are made of stainless steel with openings sufficiently small to retain media 80. T-shaped centers 94 are removably connected to pipes 88 to allow for replacement of a drain 90 should it malfunction. Centers 94 are spaced at two foot intervals with screen elements 92 positioned several inches above the bottom of cell 14.

Turning now to FIG. 3, barriers 70 are embedded in concrete containment structure 97. Branches 38 and 39 of pipes 34, air conduits 47, and pipes 22 enter the cells through end 98 of containment structure 97. A semicircular slot 29 in every other wall portion 72 permits placement of tee 26 so that outlets 27 and 28 empty into each of a pair of adjacent cells. The tee serves to reduce incoming flow velocity.

The filter control system is schematically shown in FIG. 4. A microprocessor 100 (Hewlett-Packard "Desktop Computer" Model No. 9845) monitors the system and directs the cell backwashing cycle.

Flow through each cell is switched between the normal and backwashing modes by selectively opening either its valves 24 and 36 or its valve 44, respectively. Valves 24, 36 and 44 are Aquamatic brand hydraulic valves, which are adapted to close when in communication with pressurized water source 108 (not shown in FIGS. 1-3). Communication between pressurized water source 108 and valves 24, 36 and 44 of each cell 14 is regulated by the cell's solenoid valve 110, in turn controlled by microprocessor 100.

Microprocessor 100 is connected to a flowmeter 120 (magnetic flowmeter made by Fischer & Porter Co.) and to a butterfly valve 122 (made by Henry Pratt Company), both in backwash conduit 40, and to a thermal probe 124 and to pump 42 (a high efficiency mixed flow or propeller pump made by Allis Chalmers), both in reservoir 32.

Switch array 130 is a manual backup for microprocessor 100.

OPERATION

When a pair of cells 14 is operating in the normal filtering mode (see, e.g., F in FIG. 1), microprocessor 100 signals the pair's solenoid valve 110 to close its corresponding valve 44 and open its corresponding influent and effluent valves 24 and 36. Untreated water from influent conduit 20 enters the cells through outlets 27 and 28 of the pair's tee 26 and pipe 22 and flows downwardly through filtering media 80.

The now filtered water enters drains 90 and flows through conduits 86 to branches 38 and 39 of the pair's pipe 34 and out effluent conduit 30 to reservoir 32, where it spills over weir 60 into channel 62, which discharges into a filtered water storage area (not shown).

Microprocessor 100 automatically sequences cell backwashing. A pair of cells 14 are backwashed simultaneously (see, e.g., B in FIG. 1) while the remaining cells 14 in tank 12 continue to filter influent (as shown respectively by the dashed and solid arrows in FIG. 1 indicating flow directions).

When a pair of cells 14 is to be backwashed, microprocessor 100 sends a signal to the pair's solenoid valve 110 to close its corresponding valves 24 and 36 and to open its corresponding backwash valve 44. Pump 42, activated by microprocessor 100, pumps water from reservoir 32 through conduit 40 to the pair of cells through branches 38 and 39 in the pair's pipe 34 to conduits 86 and out drains 90. Drains 90 act as nozzles, causing the backwashing water to diverge outwardly therefrom. Because the bottom of each cell includes two opposing surfaces that diverge upwardly, the backwashing water follows the contour of the cell bottom, leaving no "dead spots". The drains are arranged close enough together longitudinally to prevent substantial dead spots from forming between adjacent drains; because screen elements 92 permit 360° spraying of backwashing water, no dead spots are formed between each drain and the horizontal middle portion of the cell bottom.

The backwash water flows upwardly through media 80, removing debris. The debris-laden backwash water flows over weir 75 into troughs 76 and flows through channel 50 to sump 52, where it is discharged by pumps 54.

Microprocessor 100 also signals solenoid valve 48 of each cell 14 being washed to open to allow air to flow into the cell through its pipe 47. The air will percolate through the cell from its perforated pipe 85 through media 80, which expands upwardly around pipe 85 under the driving force of the backwashing water.

It is desirable to expand the media 80 the same amount during each backwashing cycle (e.g., about 20%, depending on the characteristics of the media). Because the viscosity of the backwashing water changes with temperature, to achieve uniform media bed expansion the backwash flow rate must be adjusted to account for variations in water temperature. Advantageously, my filter performs this task automatically. Microprocessor 100 senses the temperature and rate of flow of the water being pumped by backwash pump 42 by means of thermal probe 124 and flowmeter 120, respectively. The microprocessor determines the exact backwash flow rate needed at each water temperature level and automatically adjusts valve 122 to obtain the desired flow rate. (Microprocessor 100 opens valve 122 slowly at the beginning of each backwashing cycle for a pair of cells 14 to prevent a sudden upsurge of liquid which might otherwise upset media 80.)

Microprocessor 100 controls the duration of each backwashing cycle and also keeps accurate records of the important backwashing process parameters (e.g., frequency of cell washing, head loss through the filter, and water quality before and after filtration).

ALTERNATIVE EMBODIMENTS AND MODIFICATIONS

Other embodiments are within the following claims. For example, my twenty-six cell system has a capacity of approximately 1600 gpm. However, the system is readily adapted to the capacity requirements of a wide range of applications by altering the size of tank 12 by simply increasing or decreasing the number of cells 14. Filtering media 80 could be any one or more of a number of possible filtering materials other than sand and anthracite. Also, the system could be designed to serve as a reactor having a media 80 of granular (e.g., approximately 1 mm diameter) activated carbon or ion exchange resin or any other reactor material. The media would be at least five to seven feet deep, and the height of each cell barrier 70 would be approximately eight to ten feet.

One could also use as the microprocessor 100 a Hewlett-Packard "Desktop Computer" Model No. 9825, which is less costly than the Model No. 9845, but lacks the CRT readout and hard copy printout of the more expensive model.

What is claimed is:

1. A liquid treating system comprising:
   a tank,
   an influent conduit communicating with said tank adjacent the top thereof,
   a reservoir downstream of said tank,
   an effluent conduit disposed away from said influent conduit and communicating between said tank and said reservoir,
   a backwash conduit communicating between said reservoir and said tank, and
   means adjacent the top of said tank for carrying backwashing liquid therefrom,
   said tank comprising a multiplicity of transversely extending contiguous cells, each having at least one centrally located drain above the bottom thereof communicating with said backwash and effluent conduits, the bottom of each said cell converging downwardly around said drain,
   said drain being surrounded by filter media, and said drains having openings too small to pass any of the filter media,
   whereby when at least one of said cells operates in the normal mode, liquid to be treated flows downwardly from said influent conduit through said cell, converges toward said drain, and exits through said drain to said effluent conduit, and when at least one of said cells operates in the backwashing mode, influent is shut off to each said backwashing cell and liquid from said reservoir is pumped through said backwash conduit, diverges from said drain throughout the filter media, and flows upwardly to the top of said cell to said means for carrying the backwashing liquid out of said cell thereby cleaning said entire cell.

2. The system of claim 1 wherein said tank is rectangular and each of said cells extends across one linear dimension of said tank.

3. The system of claim 2 wherein the bottom of each said cell comprises:
   a first planar surface, and
   a second planar surface facing said first surface,
   said drain being positioned between said first and second surfaces, and said first and second surfaces sloping toward said drain.

4. The system of claim 3 wherein said first and second surfaces are each at an acute angle to the vertical.

5. The system of claim 3 or 4 wherein the bottom of each said cell further comprises:
   a third planar surface intersecting said first and second surfaces,
   said drain overlying said third surface.

6. The system of claim 5 wherein said third surface is generally horizontal.

7. The system of claim 2 wherein the width of each said cell is substantially less than its length.

8. The system of claim 1 wherein each said cell has a multiplicity of drains longitudinally spaced along the bottom of said cell.

9. The system of claim 8 wherein each of said drains includes a screen element.

10. The system of claim 8 wherein said drains are removable.

11. The system of claim 8 or 9 wherein each of said drains further comprises a T-shaped center and each of said drains has two screen elements extending from the two opposite ends of each of said centers.

12. The system of claim 1 further comprising barriers horizontally spaced in said tank separating said cells from each other.

13. The system of claim 12 wherein each said barrier comprises:
   a triangular base, and
   a vertical wall portion connected to said base.

14. The system of claim 13 wherein said drain communicates with said influent and effluent conduits through said triangular base of said barrier.

15. The system of claim 14 wherein each said cell includes a multiplicity of drains longitudinally spaced along the bottom of said cell and each of said drains includes a screen element removably connected to said base.

16. The system of claim 15 wherein each of said drains has two screen elements and further includes a T-shaped center,
said two screen elements extending from the ends of said center and said center being removably connected to said base.

17. The system of claim 12 or 13 wherein said barrier is fiberglass.

18. The system of claim 1 wherein said means for carrying backwashing liquid comprises:
a trough at the top of each cell,
a sump downstream of said tank, and
a longitudinally extending channel communicating along its length with said trough of each said cell and communicating at one end with said sump.

19. The system of claim 9 wherein said screen element is cylindrical.

20. The system of claim 1 further comprising an air pipe in each said cell, said air pipe being adapted to inject air into said cell while it is being backwashed.

21. The system of claim 1 wherein said tank is rectangular in horizontal section, each of said cells extending across one horizontal linear dimension of said tank and having a width less than the other horizontal linear dimension of said tank, and the volume of each cell being sufficiently small compared to the volume of the remaining cells that a minimal amount of liquid is required to backwash each adjacent pair of cells.

22. The system of claim 1 further comprising a plurality of valves, each of said valves being a hydraulic valve which is adapted to close when in communication with pressurized liquid, and means for controlling said valves which comprises:
a pressurized liquid source adapted to be in communication with each of said valves, and
means for regulating communication between said pressurized liquid source and each of said valves.

23. The system of claim 22 wherein said means for regulating communication between said pressurized liquid source and each of said hydraulic valves comprises:
a microprocessor, and
a solenoid valve corresponding to said hydraulic valves of each of said cells,
each of said solenoid valves being connected to said microprocessor and controlled thereby.

24. The system of claim 1 further comprising a barrier for separating said tank into discrete cells, said barrier comprising:
a vertical wall portion, and
a base connected to said wall portion adjacent the bottom of said wall portion,
said base extending longitudinally parallel to the plane of said wall portion and having a pair of sides diverging downwardly from the plane of said wall portion on opposite sides of said wall portion,
whereby when two or more of said barriers are transversely spaced in said tank, they form discrete cells therebetween having downwardly converging bottoms.

25. The barrier of claim 24 wherein said base has a drain in one of said sides and the inside of said base has a hollow conduit portion communicating between said drain and at least one longitudinal end of said base.

26. The barrier of claim 24 or 25 wherein said base is triangular in a transverse cross section.

27. The barrier of claim 26 wherein said conduit portion is triangular in a transverse cross section.

28. The barrier of claim 24 wherein said base and wall portion are fiberglass.

29. The barrier of claim 24 wherein said base has a multiplicity of longitudinally spaced drains.

30. The barrier of claim 29 wherein said drains are removable.

31. A liquid-treating system comprising:
a longitudinally extending tank,
said tank having a multiplicity of contiguous cells extending lengthwise transversely of said tank, the width of each of said cells being less than its length,
influent conduit means for supplying liquid to be treated to each of said cells,
said influent conduit means communicating with each of said cells adjacent the tops thereof,
effluent conduit means for removing treated liquid from each of said cells, and
means for backwashing one or more of said cells while the remaining cells continue treating said liquid,
said means for backwashing comprising
a multiplicity of drains longitudinally spaced along the bottom of each of said cells,
backwash conduit means communicating with each of said drains,
said effluent conduit means communicating with each of said drains,
means for carrying backwashing liquid from each of said cells,
said means for carrying communicating with each of said cells adjacent the tops thereof,
a reservoir downstream of said tank and communicating therewith through said backwash conduit means,
a thermal probe in said reservoir,
a pump in said reservoir connected to said backwash conduit means,
a flow regulating valve in said backwash conduit means between said pump and at least one cell, and
means for controlling said flow regulating valve to control the flow from said pump through said backwash conduit means in response to temperature input from said probe, for maintaining uniformity of filter bed expansion among each of said cells during backwashing thereof.

32. The system of claim 31 wherein said means for controlling said flow regulating valve is a microprocessor.